Sept. 15, 1931.  A. WRIGHT  1,822,985
SWIVEL ATTACHMENT PLUG
Filed June 16, 1930
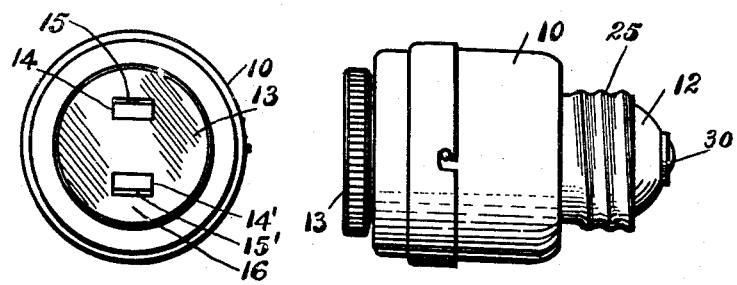
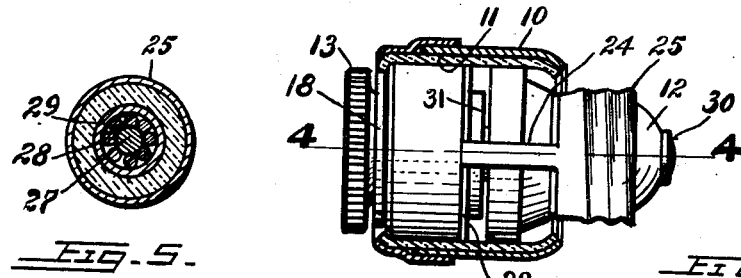
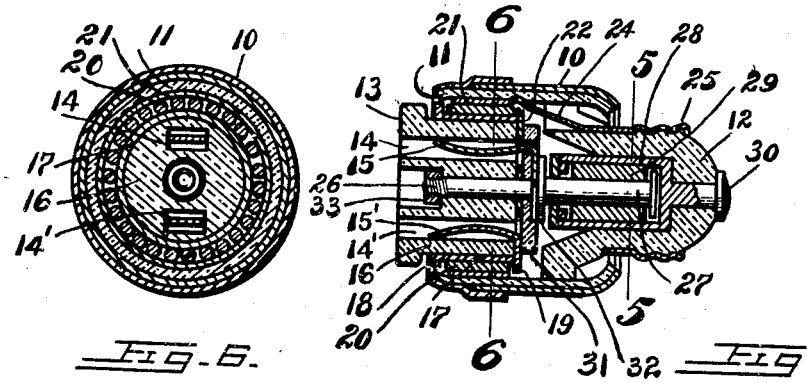
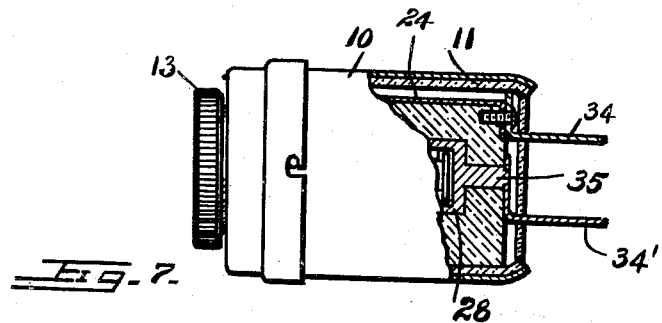
Inventor,
Alfred Wright
By Frederick E. Bromley
Attorney.

Patented Sept. 15, 1931

1,822,985

UNITED STATES PATENT OFFICE

ALFRED WRIGHT, OF PARRY SOUND, ONTARIO, CANADA

SWIVEL ATTACHMENT PLUG

Application filed June 16, 1930. Serial No. 461,509.

The invention relates to improvements in swivel attachment plugs as described in the present specification and shown in the accompanying drawings which form part of the same.

The present invention appertains to swivel plugs for precluding the cord of a cap from twisting while the plug is being screwed in a socket or like receptacle.

The object of the invention is to produce a highly efficient and serviceable plug of this nature in which anti-friction members are utilized in the swivel joint in such a manner as to obtain a free swivelling action and yet provide continuous electric conducting paths for the current.

Referring to the drawings, Figure 1 is a face view of the cap end.

Figure 2 is a side elevation of the plug.

Figure 3 is a similar view, but showing the case in section.

Figure 4 is a lengthwise section taken on the line 4—4 of Figure 3.

Figure 5 is a transverse section taken on the line 5—5 of Figure 4.

Figure 6 is a further transverse section, but taken on the line 6—6 of the same figure.

Figure 7 is a slight modification of the invention depicting a pair of prongs substituted for the screw base.

Like numerals of reference indicate similar parts in each of the figures throughout the drawings.

In the drawings, the reference numeral 10 generally denotes the casing, which may be of any suitable design, that shown in the drawings being given by way of example but not of limitation. Within the casing is a lining of insulating material 11, and from one of its ends rigidly projects the base 12 for screwing in a lamp socket or other receptacle. From the other end of said casing projects the swivel female element 13 for connection to the conventional cap—not shown since it does not form a part of the present invention. The prongs of the cap fit into the openings 14, 14', so as to electrically connect the cord or wires to the contacts 15, 15'.

The female element 13 comprises an insulation body 16 provided with the openings 14, 14', and encompassed by an inner race 17 of an anti-friction bearing, preferably of the roller type shown. The inner race is fixedly secured on the body in any suitable manner and is adequately supplied with end flanges 18 and 19 for retention of the rollers 20. The outer race 21 is fixedly secured in the casing such as by making it a press fit in the insulation lining 11.

It is suggested that a disc or disc-like member 22 may be secured at the inner end of the female member 13 in order that its peripheral edge may be used as the flange 19 that is integral with or secured to the inner race 17. The disc is joined to the contact 15' so as to serve as an electric conductor between this contact and the anti-friction bearing.

The outer race of this bearing has an electrical conducting strip 24 extending from it and connected either permanently or detachably to the screw shell 25 of the base 12.

In this manner the contact 15' is constantly electrically connected to the metal shell 25 of the base 12 irrespective of the swivelling of the female element 13.

Axially and firmly secured in the body 16 is a spindle 26 having its inner end 27 rotatably mounted in an anti-friction bearing composed of the outer race 28 and rollers 29 which ride directly upon the spindle. The outer end of the spindle may have an integral retaining collar for the rollers 29, while the opposite end of the outer race may have a collar for retaining the rollers at this end.

The outer end of the outer race 28 is electrically connected to the central contact 30 of the base 12. The contact 15 of the female element 13 is electrically connected to the spindle 26 and has an interposed insulating disc 31. A metal annulus 32 fitted on the spindle contacts with the contact 15 and also forms a shoulder for the spindle to enable it to be secured to the body by the nut 33.

It will be manifest from the preceding description that the contact 15 is electrically connected to the central contact 30 of the base through the medium of the spindle 26 and its anti-friction bearing. Thus the base 12 may be freely screwed in or out of a lamp socket or other fixture without imparting a turning movement to the female element 13 to which the cap and its cord are attached in the use of the plug.

Adverting to the modification shown in Figure 7, the same structure is employed here excepting that the screw base is replaced by prongs 34, 34' for establishing an electrical connection. The prong 34 is connected to the conductor strip 24 which in turn is connected to the outer race of the anti-friction bearing surrounding the body 16. The companion prong 34' is connected to the outer race 28 by the conductor 35. The swivelling movement in this case is precisely the same as that previously recounted.

What I claim is:—

A swivel attachment plug consisting of a casing, an insulation body provided with openings, a pair of contacts disposed in said openings, an anti-friction bearing mounted in said casing, the inner race of said bearing being fixedly secured on the insulation body to swivelly mount it in the casing, a metal spindle firmly secured in said insulation body and axially projecting from its rear face, a metal disc fitted to said rear face of the body, the periphery of said disc constituting a flange for the anti-friction members of said bearing and being secured to the inner race thereof, one of the contacts of the insulation body being secured to said disc, a metal annulus fitted on said spindle and electrically connected to the companion contact thereof, an insulation disc interposed between said metal disc and said annulus, a base supported in the casing and comprising a pair of contacts for establishing an electric connection with a source of supply, a bearing swivelly mounting the spindle in the base, means electrically connecting one of the base contacts with the spindle and means for similarly connecting its companion with the outer race of the anti-friction bearing.

Signed at Parry Sound, Ontario, Canada, the 31st day of May 1930.

ALFRED WRIGHT.